(12) United States Patent
Cresens

(10) Patent No.: US 7,773,831 B2
(45) Date of Patent: Aug. 10, 2010

(54) METHOD FOR VISUAL INSPECTION OF SIZE-REDUCED DIGITAL IMAGE

(75) Inventor: Marc Cresens, Diest (BE)

(73) Assignee: Agfa-Gevaert N.V., Mortsel (BE)

( * ) Notice: Subject to any disclaimer, the term of this patent is extended or adjusted under 35 U.S.C. 154(b) by 1148 days.

(21) Appl. No.: 11/379,272

(22) Filed: Apr. 19, 2006

(65) Prior Publication Data

US 2006/0256387 A1 Nov. 16, 2006

Related U.S. Application Data

(60) Provisional application No. 60/688,931, filed on Jun. 9, 2005.

(30) Foreign Application Priority Data

May 10, 2005 (EP) .................................. 05103882

(51) Int. Cl.
*G06K 9/32* (2006.01)
*G06K 9/40* (2006.01)
*G09G 5/00* (2006.01)

(52) U.S. Cl. ...................... 382/298; 382/275; 345/670; 345/698

(58) Field of Classification Search ................. 382/298; 345/670, 698
See application file for complete search history.

(56) References Cited

U.S. PATENT DOCUMENTS

| | | | | |
|---|---|---|---|---|
| 5,097,518 | A * | 3/1992 | Scott et al. .................. | 382/298 |
| 5,138,672 | A * | 8/1992 | Hirabayashi et al. ........ | 382/264 |
| 5,309,524 | A * | 5/1994 | Hirabayashi et al. ........ | 382/298 |
| 5,428,461 | A * | 6/1995 | Yamashita et al. .......... | 358/451 |
| 5,448,654 | A * | 9/1995 | Katayama et al. ........... | 382/298 |
| 5,621,826 | A * | 4/1997 | Katayama et al. ........... | 382/298 |
| 5,774,601 | A * | 6/1998 | Mahmoodi .................. | 382/298 |
| 5,917,963 | A * | 6/1999 | Miyake ....................... | 382/300 |
| 6,075,906 | A * | 6/2000 | Fenwick et al. ............. | 382/298 |
| 6,181,834 | B1 * | 1/2001 | Li et al. ...................... | 382/298 |
| 6,215,916 | B1 * | 4/2001 | Acharya ...................... | 382/298 |
| 6,252,577 | B1 * | 6/2001 | Rashkovskiy et al. ....... | 345/670 |
| 6,400,413 | B1 * | 6/2002 | Miyake ....................... | 348/581 |
| 6,975,779 | B1 * | 12/2005 | Brett et al. .................. | 382/298 |

(Continued)

FOREIGN PATENT DOCUMENTS

EP 1 052 598 A2 11/2000

(Continued)

*Primary Examiner*—Wenpeng Chen
*Assistant Examiner*—Gandhi Thirugnanam
(74) *Attorney, Agent, or Firm*—Houston Eliseeva LLP

(57) ABSTRACT

A method for generating an output image by reducing the size of an input image by determining for a pixel location (i,j) in the output image a corresponding area$_{xy}$ in the input image, fetching the input image area$_{xy}$ pixel values, calculating an output pixel value Dij for the pixel location (i,j) using a size reducing algorithm, inserting Dij in the output image and repeating the previous steps for each pixel location (i,j) in the output image. The value Di,j is obtained by adding to the lower resolution background representation A of the input image area pixel values with a value obtained by amplifying MED, representing the pixel value in the input image area that most deviates from said lower resolution background representation A, by means of a significance factor SF.

14 Claims, 3 Drawing Sheets

U.S. PATENT DOCUMENTS

| | | | |
|---|---|---|---|
| 7,155,069 B2* | 12/2006 | Ishizaka | 382/298 |
| 7,289,154 B2* | 10/2007 | Gindele | 348/364 |
| 7,408,672 B2* | 8/2008 | Ito | 358/1.2 |
| 7,450,639 B2* | 11/2008 | Song | 375/240.12 |
| 2003/0179953 A1* | 9/2003 | Ishizaka | 382/298 |
| 2003/0218620 A1* | 11/2003 | Lai et al. | 345/670 |
| 2005/0089247 A1* | 4/2005 | Braun et al. | 382/298 |
| 2005/0146540 A1* | 7/2005 | Marshall et al. | 345/698 |
| 2005/0281479 A1* | 12/2005 | Song | 382/275 |

FOREIGN PATENT DOCUMENTS

| | | |
|---|---|---|
| EP | 1 154 378 A2 | 11/2001 |
| EP | 1 465 107 A2 | 10/2004 |

\* cited by examiner

METHOD FOR VISUAL INSPECTION OF SIZE-REDUCED DIGITAL IMAGE

CROSS-REFERENCE TO RELATED PATENT APPLICATIONS

This application claims the benefit of U.S. Provisional Application No. 60/688,931 filed Jun. 9, 2005, which is incorporated by reference. In addition, this application claims the benefit of European Application No. 05103882.6 filed May 10, 2005, which is also incorporated by reference.

FIELD OF THE INVENTION

The present invention relates to a method for improved visual inspection of a digital image. More specifically the invention is related to a method for reducing the size of a digital image for improved visual inspection.

BACKGROUND OF THE INVENTION

Digital imaging systems are becoming increasingly widespread for producing digital data that can be reconstructed into for example useful radiographic images. In one application of a digital imaging system, radiation from a source is directed toward a subject, typically a patient in a medical diagnostic application, and a portion of the radiation passes through the subject and impacts a detector upon. Upon stimulation by means of light of an appropriate wavelength, the surface of the detector converts the radiation to light photons, which are sensed. In case of computed radiography (CR) the detectors are phosphor screens which can show artifacts such as pits, scratches, cracks, stains, sensitivity variation, dose-response irregularities, etc. In case of one or two dimensional direct radiography (DR) the detector is divided into arrays of independent, solid-state detector elements, and encodes output signals based upon the quantity or intensity of the radiation impacting each detector element. The occurrence of defective response of a single detector element or a set of clustered detector elements or associated driver elements can cause single pixel image artifacts or row- or column-wise line artifacts. The presence of artifacts in the reconstructed images can lead to misinterpretation by the physician. So it is important to regularly check the quality of the detectors. Therefor the detectors are uniformly exposed to X-rays and the reconstructed images are visually inspected for artifact occurrence.

However, visual inspection for artifact occurrence in CR or DR detected images is often time consuming obstructing an efficient workflow. The size of the inspection window matrix on the workstation is often too small to fit the entire detected image. Because of the display-matrix limitations, the even smaller surface-fraction for the inspection window and the vastness of the original image matrix, the original image is sliced into a set of adjacent tile-images prior to artifact inspection at pixel-level. For example a size 35×43 centimeter (cm) CR-detector screen scanned at 100 micron pixel resolution generates a 3.5 K×4.3 K (15 Mega pixel) image. At least twenty different 1K×1K (1 Mpixel) tile-images would be required for inspection to cover all the information present in the original image.

To overcome this problem the original image can be converted into a smaller image fitting into the inspection window using conventional downsizing techniques. In US-A-2003/0218620 a method is described for displaying an electronic document on a digital handheld device whereby first a reduction ratio is calculated equal to a ratio of an original document width to the digital handheld device screen width. Thereafter the reduced document is built having a size related to the original document by the reduction factor. Often used conventional downsizing techniques are sub-sampling or interpolation.

Sub-sampling is a technique that either replicates (copies) or skips row- and column-data in a repetitive way while creating the downsized output image. Since raw image data are passed unattenuated, sub-sampling preserves the amplitude of fine details. However not all possible interesting information is transferred with certainty to the smaller output image. Most of the original image content is inevitably lost by the process-inherent pixel-data skipping. Output image signaling of the finest detail occurrence in the original image is only supported if the pixel replication point coincides with the fine detail location. Guaranteed transfer of all information relevant for inspection between the original image and the resulting downsized output image is by consequence impossible.

Interpolation is an alternative technique often used for image resizing. Known interpolation techniques are the smoothing average, nearest neighbour, bi-linear, bi-cubic spline and high-resolution cubic spline kernels. Interpolation is a technique that uses spatial convolution of the pixel-data with the interpolation kernel coefficients to obtain a downsized image. Due to this the medium and high spatial frequency components, mainly representing fine image disturbances, are represented with higher attenuation than the lower spatial frequency components after resizing. The attenuation-level depends on the frequency-response curve, mathematically linked to the spatial scope and shape of the convolution kernel-coefficients used. As these kernel-coefficients are different (except for the smoothing average kernel), the attenuation-level also depends on the location of the image-disturbance relative to the interpolation point. Both effects lead to reduced detectability of isolated, medium and high spatial frequency disturbances, present in the original image, after downsizing.

To overcome the above mentioned problems a need exists for an improved workflow to detect artifacts during visual image inspection whereby the original image is converted into an image fitting the inspection window and image overview is preserved. Furthermore there is a need to signal the presence of artifacts with certainty, regardless of their spatial frequency content or image location, such that they can be detected more easily during visual artifact inspection.

SUMMARY OF THE INVENTION

In general according to one aspect, the invention features a method for generating an output image by reducing the size of an input image. This method comprises the following steps: determine for a pixel location (i,j) in the output image a corresponding area$_{xy}$ in said input image, fetch the input image area$_{xy}$ pixel values, calculate an output pixel value $D_{ij}$ for the pixel location (i,j) using a size reducing algorithm, insert $D_{ij}$ in the output image, repeat the steps for other, such as each, pixel location (i,j) in the output image. The value Di,j is obtained by adding to the lower resolution background representation A, obtained by processing the amount of area$_{xy}$ pixel data to a single low pass filtered area value, a value obtained by amplifying the MED which represents the pixel value in the input image area that most deviates from said lower resolution background representation A, with a significance factor SF.

In embodiments, the A is obtained by statistical order filtering or spatial convolution filtering of the input image area pixel values. The MED is obtained by subtracting A from the most extreme pixel data ME being the value which deviates most from A, detected in the input image area$_{xy}$. The significance factor SF is a function of the relative excentricity RE which is obtained as the ratio MED/SD whereby SD is a measure for the local noise-level in the input image. The SD is the standard deviation of the area$_{xy}$ centered input image region, and SD is obtained by interpolation between the predetermined standard deviations of undisturbed, neighbouring regions. The RE is converted into SF by means of a significance graph and wherein the significance graph is predetermined and/or user controllable. The significance graph has two center-concatenated conversion graphs that are characterized by separate, parametric mathematical models controlling RE range, SF gain and the steepness of the significance graph. The RE range of the significance graph is controlled by offset values s and t. The SF gain of said significance graph is controlled by clipping levels g and h. The steepness of the significance graph is controlled by values u and v.

Preferably, two output images are created by applying two contrasting sets of significance graph values. The output images are displayed alternating at a preset rate to improve visual inspection.

Further advantages and embodiments of the present invention will become apparent from the following description and drawings.

DETAILED DESCRIPTION OF THE INVENTION

According to principles of the method of present invention, a large input image oversizing the display window is reduced to a small output image matching the display window for visual artifact inspection employing an image size-reducing algorithm. According to this method low and high spatial frequency disturbances which are sufficiently significant and relevant for visual artifact inspection are transferred with high efficiency for artifact-signaling purposes from the original input image to the downsized output image, presented for compacted full image display. Also the presence of local significant single-pixel disturbances, the smallest possible image disturbances, is signaled in the downsized output image regardless of the size-reduction factors (bi-directional) used and of the location of the disturbance inside the original image.

Figure 1:
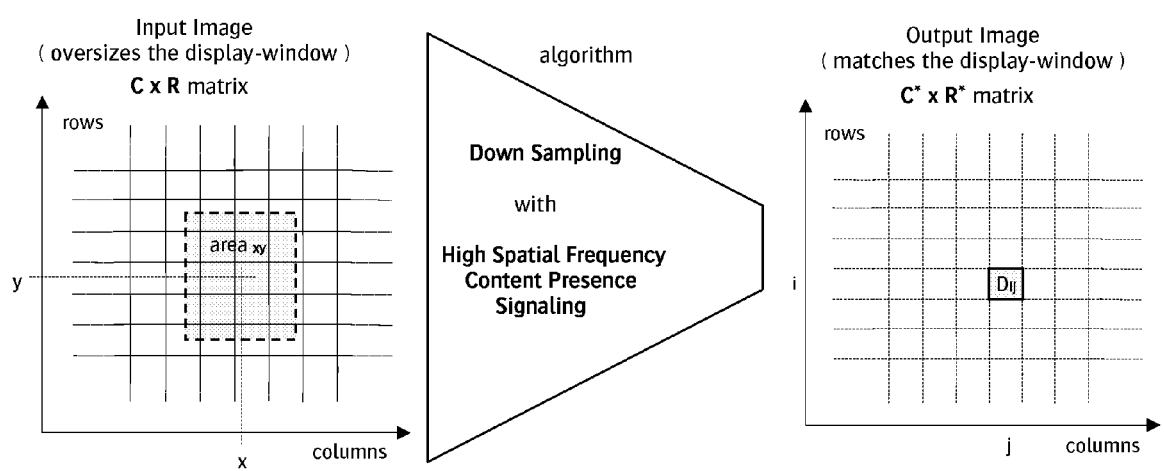
FIG. 1 shows the transformation of a large input image into a reduced size output image.

According to principles of the present invention as shown in FIG. 1, the image size reducing algorithm transforms a larger input image into a reduced size output image while passing low spatial frequency content in the input image on to the output image and signaling the presence of significant medium and high spatial frequency disturbances with high efficiency and spatial magnification. Down-sampling reduces the total amount of pixels by a factor: C. R/(C*. R*) whereby C and C* represent the number of columns in respectively the input and output image and R and R* represent the number of rows in respectively the input and output image. Each pixel $D_{ij}$ in the size-reduced output image is spatially associated with a given input image area$_{xy}$. Each output image pixel $D_{ij}$ is calculated by means of an image size reducing algorithm, crunching the pixel data present in area$_{xy}$, spanning the spatially related input image pixels.

Figure 2:
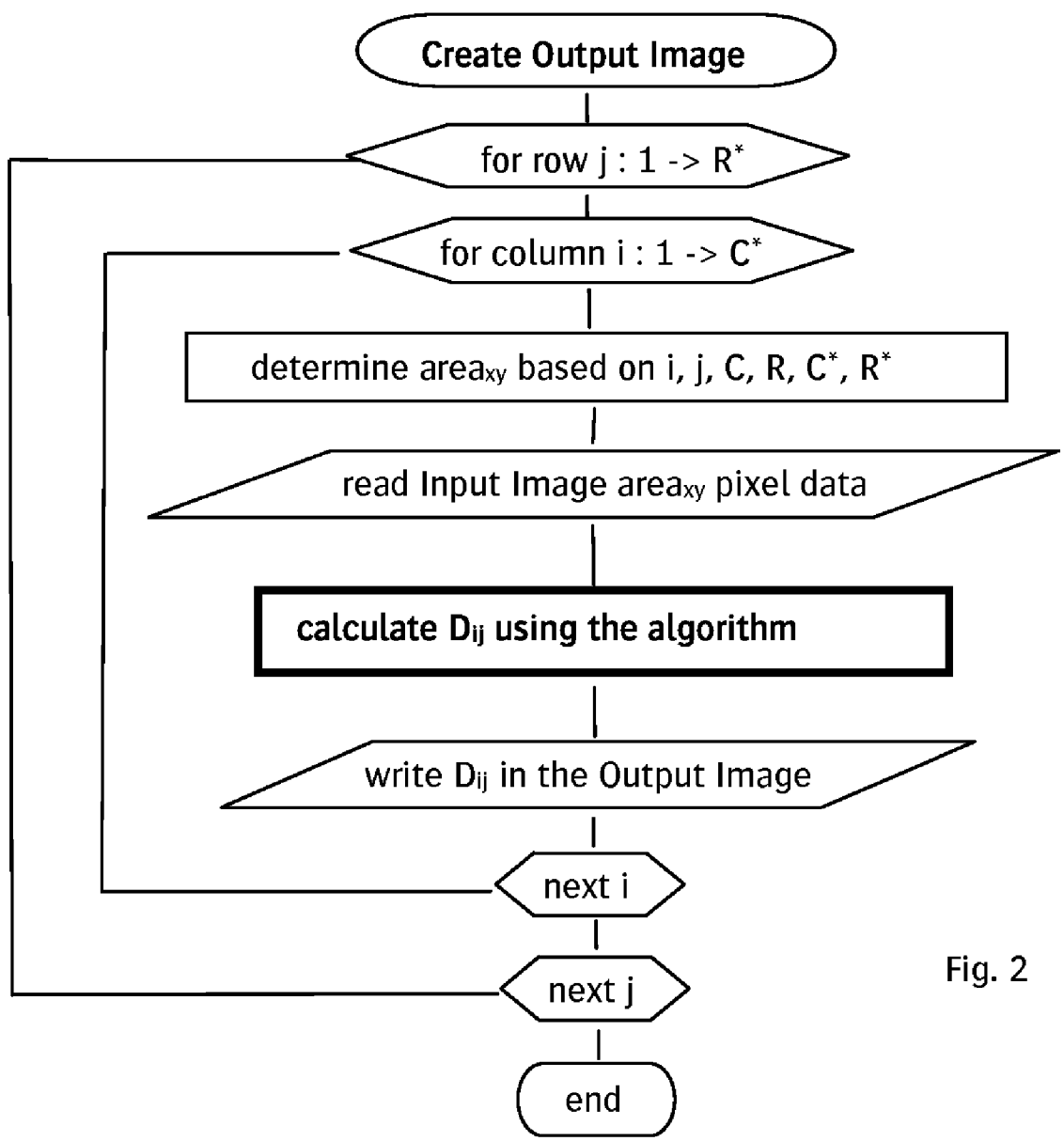
FIG. 2 shows the double nested processing flow to convert a large input image into a smaller output image.

The processing flow according to principles of the present invention to obtain the output image pixel $D_{ij}$ is illustrated in FIG. 2. The diagram in FIG. 2 shows a double nested loop processing flow required to transform a large input image into a smaller output image. During each passage through the flow diagram's main branch the following operations are sequentially executed to calculate the value of a single output image pixel $D_{ij}$:

a) the column and row output image indices i and j and the input and output image matrix sizes (C.R and C*.R*) are used to calculate the center-coordinates x and y of the spatially associated input image area selected for conversion. The amount of area pixels, and the area aspect ratio required are determined by the column- and row-wise shrink factors: C/C* and R/R* b) the selected area pixel coordinates are determined.

c) the area's pixel data are read from the input image.

d) the output pixel data are calculated using the image size-reducing algorithm.

e) the result from the calculation is stored at the selected output image pixel location $D_{ij}$.

f) the column- and row-indices are updated to address the next output image pixel.

After all output image pixel locations have been addressed accordingly the image size reducing process is stopped.

Figure 3:
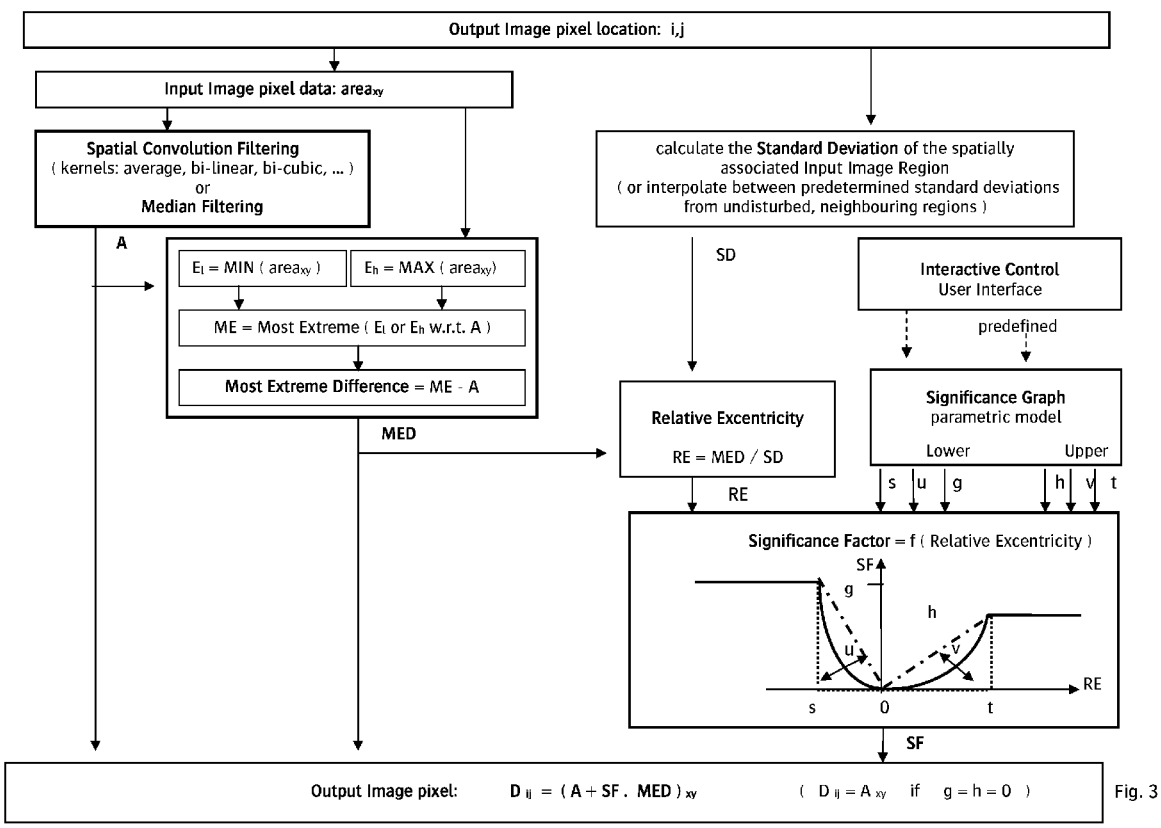
FIG. 3 shows the size reduction algorithm.

The internal processing of the algorithm that is used according to a principle of the method of the present invention to calculate the output image pixel data is shown in detail in FIG. 3. Three cascaded processing steps generate the intermediate data required to calculate the output image pixel value $D_{ij}$.

Generally, the output pixel value $D_{ij}$ is calculated as the sum of a lower spatial frequency filtered component A and a weighed MED (most extreme difference) component, signaling the presence and magnitude of higher spatial frequency content in area$_{xy}$.

The relative impact of adding the MED component on $D_{ij}$ is controlled by the coupling gain SF (significance factor), expressing the relative significance of the higher spatial frequency detail found with respect to the noise level present in the associated, larger image area$_{xy}$ selected.

The processing steps of the algorithm will now de discussed in more detail. In the first processing step the amount of area$_{xy}$ pixel-data elements is reduced to a single, low pass filtered area value A. This value A acts as a local, lower resolution, background-representation of all the pixel data present in area$_{xy}$ selected for conversion. For this data reduction, statistical order filtering (SOF), also known as median filtering, or spatial convolution filtering is used. For the spatial convolution filtering, known interpolation kernels such as smoothing average, bi-linear and bi-cubic spline can be used but also other kernels showing low pass filter properties can be applied.

The spatial frequency response characteristics of this size reducing process depend on the targeted image size reduction factor C. R/(C*. R*) and on the filtering technique and kernel chosen for conversion.

Offset, the image background, as well as low and medium spatial frequency disturbances are transmitted with high efficiency towards the condensed, low pass filtered area-signal A.

In a second, cascaded processing step the previously calculated value A acts as a reference for comparison with the raw area$_{xy}$ pixel data to find the magnitude and the polarity of the most extreme difference (MED) between any pixel data item located inside area$_{xy}$ and the locally smoothed value A. Therefore area$_{xy}$ is scanned to find the minimum ($E_l$) and the maximum ($E_h$) pixel data locally available. These minimum and maximum values are compared with value A to determine which of both deviates most from A. The most extreme pixel data (ME) is the value which deviates most from A. Finally MED, the most extreme difference is calculated by subtracting A from the most extreme pixel data (ME) detected. This intermediate, single result (MED) is being created from the multitude of raw input image pixel data and denotes image size reduction. The magnitude and the polarity of MED depend on the data content of a single pixel located somewhere within the area$_{xy}$. Since A is a low spatial frequency filtered representation of all the pixel-data present in area$_{xy}$, MED is hardly sensitive to the spatial location of the most extreme pixel relative to the area$_{xy}$ boundaries. The combination of both properties assures magnitude and polarity signaling of single pixel image disturbances, regardless of their location inside the selected input image area under conversion.

In absence of significant high frequency image content inside area$_{xy}$, MED will represent the most extreme local noise pixel data found.

Image size reduction improves the detectability of small input image disturbances since these are, seen from a relative spatial perspective, maximally magnified by the fact that they show up as a full output image pixel, representing several downsized input image pixels.

In a third cascaded process step the relative excentricity RE is obtained by comparing the MED with the standard deviation SD of the image data in the a spatially associated larger region surrounding area$_{xy}$. This SD is a measure for the local noise-level present in the input image. Also SD can be obtained by interpolation between predetermined standard deviations from undisturbed, neighbouring regions.

The local noise-level normalized MED value RE, is calculated as the ratio: MED/SD. Therefore, high RE values denote a high amount of significant high spatial frequency image content and low RE values denote the presence of only image noise.

In the next step RE is converted into a significance factor SF by means of a predefined and/or user controllable significance graph. This significance graph, centered around the low pass filtered area$_{xy}$ value A (RE=0, ME=A), determines the level of multiplicative coupling that is assigned to MED during the final calculation of the output pixel $D_{ij}$.

The significance graph is comprises, and in some embodiments is only composed of, two center-concatenated conversion graphs, each addressing one polarity of the relative excentricity (RE) axis.

The lower (RE<0) and upper (RE>0) parts of the graph are characterized by means of separate parametric mathematical models, each controlling the RE-range, the SF gain, the shape and the steepness of the compound conversion graph.

The RE range can be controlled by the offset values s and t, the SF gain can be controlled by the clipping levels g and h while the steepness and shape of the graph can be controlled by values u and v.

As a result different transfer behavior can be assigned to higher frequency disturbances depending on whether their pixel values are bigger or smaller than A. The graph's shape can vary from linear over increasingly curved to step-wise discontinuous. Exponential, parabolic, hyperbolic, ellipsoidal as well as some goniometrical mathematical models are suited for parametric graph control. Clipping functionality can also be added as shown in the block diagram.

The RE-ranges: "s to 0" and "0 to t" can be modified to be either big or small and symmetrically or asymmetrically positioned relative to the SF-axis.

Both significance factors clipping levels, g and h, can be either positive or negative and can be either bigger or smaller than unity. A different polarity of g and h enables the conversion of both brighter and darker input image disturbances to either brighter or darker entities in the output image.

The bigger the relative excentricity (higher MED relative to SD,), the higher the chance that an interesting higher spatial frequency feature, worth inspecting, is present in area$_{xy}$.

Therefore gradually more significance factor coupling is assigned with increasing RE. This suppresses the disturbing impact of local noise extremities in undisturbed image areas on the reduced size output image whereby improved visualization during output image inspection is obtained.

After determination of A, MED and SF, the output image pixel value can be computed as: $D_{ij}=(A+SF \cdot MED)_{xy}$.

After all the output image pixels have been calculated, a downsized output image is obtained that can be presented for visual inspection on a single display window. The image is presented in such a way that significant (relative to the local noise-level) low, medium and high spatial frequency image-disturbances, possibly occurring in the larger input image, are signaled with increasing spatial magnification on a smoothed background.

To further improve visual artifact detection, the medium and small image disturbances can be made flashing on top of a steady background. This can be obtained by processing the same input image with two contrasting sets of significance factor graph controls whereby two different reduced size output images can be created that can be stored separately. By toggling between both stored images, presented in the same inspection-window, at a rate optimized for maximum disturbance of the human vision system, the higher spatial frequency features, occurring in the input image, will more easily attract attention during inspection of the output image.

According to a further aspect of the present invention during inspection of the single-window, size-compressed output image the predefined significance factor graph controls (s,u, g,h,v,t) can be overridden by means of easy, interactive changes externally introduced via the user interface. This way the user can determine the shape of the significance graph, the clipping level and the slope/steepness of the significance graph. As a result the user can decide which low, medium or high frequency disturbances occurring in the input image will be signaled in the output image.

What is claimed is:

1. A method for generating an output image by reducing the size of an input image, comprising:
    determine for pixel locations in said output image corresponding areas in said input image,
    fetch input image pixel values from said corresponding areas,
    calculate output pixel values for each of said pixel locations in said output image using a size reducing algorithm, and
    insert the output pixel values in the output image,
    wherein said output pixel values are obtained by adding to a lower resolution background representation A, which is obtained by processing the corresponding areas in said input image to a single low pass filtered area value, a value obtained by amplifying a MED, which represents a pixel value in said input image area that most deviates from said lower resolution background representation A, with a significance factor SF, which represents a relative significance of higher spatial frequency detail with respect to a noise level present in the corresponding areas of the input image.

2. The Method according to claim 1 wherein the lower resolution background representation A is obtained by statistical order filtering or spatial convolution filtering of said input image area pixel values.

3. A method for generating an output image by reducing the size of an input image, comprising:
   determine for pixel locations in said output image corresponding areas in said input image,
   fetch input image pixel values from said corresponding areas,
   calculate output pixel values for each of said pixel locations in said output image using a size reducing algorithm, and
   insert the output pixel values in the output image,
   wherein said output pixel values are obtained by adding to a lower resolution background representation A, which is obtained by processing the corresponding areas in said input image to a single low pass filtered area value, a value obtained by amplifying a MED, which represents a pixel value in said input image area that most deviates from said lower resolution background representation A, with a significance factor SF which represents a relative significance of higher spatial frequency detail with respect to a noise level present in the corresponding area of the input image, and
   wherein said MED is obtained by subtracting the lower resolution background representation A from a most extreme pixel data ME being the value which deviates most from the lower resolution background representation A, detected in the corresponding areas in the input image.

4. A method for generating an output image by reducing the size of an input image, comprising:
   determine for pixel locations in said output image corresponding areas in said input image,
   fetch input image pixel values from said corresponding areas,
   calculate output pixel values for each of said pixel locations in said output image using a size reducing algorithm, and
   insert the output pixel values in the output image,
   wherein said output pixel values are obtained by adding to a lower resolution background representation A, which is obtained by processing the corresponding areas in said input image to a single low pass filtered area value, a value obtained by amplifying a MED, which represents a pixel value in said input image area that most deviates from said lower resolution background representation A, with a significance factor SF, and
   wherein said significance factor SF is a function of the relative eccentricity RE which is obtained as the ratio MED/SD, SD being a measure of the local noise-level in the input image.

5. The method according to claim 4 wherein the value of SD is a standard deviation of an area$_{xy}$ centered input image region.

6. The method according to claim 4 wherein SD is obtained by interpolation between predetermined standard deviations of undisturbed, neighboring regions in said input image.

7. The method according to claim 4 wherein RE is converted into SF by means of a significance graph and wherein said significance graph is predetermined and user controllable.

8. The method according to claim 7 wherein said significance graph is comprised of two center-concatenated conversion graphs that are characterized by separate, parametric mathematical models controlling RE range, SF gain and the steepness of the significance graph.

9. The Method according to claim 7 wherein the RE range of said significance graph is controlled by offset values s and t, where values s and t are the lower and upper values of the RE range.

10. The Method according to claim 7 wherein the SF gain of said significance graph is controlled by clipping levels g and h, where values g and h are the lower and upper values of the clipping range.

11. The Method according to claim 7 wherein the steepness of said significance graph is controlled by values u and v, where values u and v are parametric model variables that control the steepness of the significance graph.

12. A method for generating an output image by reducing the size of an input image, comprising:
   determine for pixel locations in said output image corresponding areas in said input image,
   fetch input image pixel values from said corresponding areas,
   calculate output pixel values for each of said pixel locations in said output image using a size reducing algorithm, and
   insert the output pixel values in the output image,
   wherein said output pixel values are obtained by adding to a lower resolution background representation A, which is obtained by processing the corresponding areas in said input image to a single low pass filtered area value, a value obtained by amplifying a MED, which represents a pixel value in said input image area that most deviates from said lower resolution background representation A, with a significance factor SF which represents a relative significance of higher spatial frequency detail with respect to a noise level present in the corresponding area of the input image, and
   wherein two further output images are created by applying two contrasting sets of significance graph values.

13. The Method according to claim 12 wherein said output images are displayed alternating at a preset rate to improve visual inspection.

14. The Method according to claim 4 wherein RE is converted into SF by means of a significance graph and wherein said significance graph is predetermined or user controllable.

* * * * *